United States Patent [19]

Kobayashi

[11] Patent Number: 4,505,848

[45] Date of Patent: Mar. 19, 1985

[54] SILICONE RUBBER MOLDED PRODUCTS AND A METHOD FOR PRODUCING SAME

[75] Inventor: Hideki Kobayashi, Ichihara, Japan

[73] Assignee: Toray Silicone Company, Ltd., Tokyo, Japan

[21] Appl. No.: 489,443

[22] Filed: Apr. 28, 1983

[30] Foreign Application Priority Data

May 25, 1982 [JP] Japan ................................ 57-89245

[51] Int. Cl.$^3$ .............................................. H01B 1/06
[52] U.S. Cl. .................................... 252/511; 524/495; 264/105
[58] Field of Search ....................... 252/511, 502, 510; 524/495, 496; 264/105; 428/447

[56] References Cited

U.S. PATENT DOCUMENTS

| | | | |
|---|---|---|---|
| 4,062,813 | 12/1977 | Andnanor et al. | 252/511 |
| 4,302,361 | 11/1981 | Kotani et al. | 252/511 |
| 4,357,266 | 11/1982 | Sado et al. | 252/511 |

FOREIGN PATENT DOCUMENTS

| | | | |
|---|---|---|---|
| 50-2080 | 1/1975 | Japan | 428/447 |

Primary Examiner—Josephine L. Barr
Attorney, Agent, or Firm—Robert Spector

[57] ABSTRACT

Cured unitary molded articles containing conductive and insulating silicone rubber components are prepared by tightly contacting a curable insulating silicone rubber composition comprising a curable silicone rubber containing substantially no carbon black and a nonacyl-type peroxide with a cured conductive silicone rubber component containing carbon black and which has been cured by an addition reaction in the presence of a platinum-type catalyst and molding the resultant composition at elevated temperatures to cure the insulating silicone rubber component and form a unitary cured silicone rubber article.

This invention also relates to cured silicone rubber articles prepared using the method of this invention.

18 Claims, No Drawings

SILICONE RUBBER MOLDED PRODUCTS AND A METHOD FOR PRODUCING SAME

BACKGROUND OF THE INVENTION

1. Field of the Invention

This invention relates to silicone rubber molded products and a method for their production. More particularly, this invention relates to silicone rubber molded products that are unitary articles containing a cured conductive silicone rubber component containing carbon black and a cured silicone rubber component containing substantially no carbon black.

2. Description of the Prior Art

Molded silicone rubber articles in which the cured body has a portion of silicone rubber containing carbon black and a portion of silicone rubber containing substantially no carbon black are widely used as two-color keyboard pads, zebra-type connectors, and electrical contacts in various types of electrical and electronic parts.

Japanese Patent Publication No. 56(1981)-41417 published Sept. 28, 1981 in the names of Sado, et al. describes a method for producing the aforementioned molded silicone rubber articles. An unvulcanized carbon black-containing silicone rubber is combined with an organic peroxide and then molded at an elevated temperature under an elevated pressure to obtain the conductive silicone rubber cured, i.e., vulcanized, component. An unvulcanized insulating silicone rubber containing substantially no carbon black is combined with an organic peroxide having an activation energy of at least 33 kcal/mole and the resulting mixture, together with the above-mentioned cured conductive component, is molded at an elevated temperature under an elevated pressure to manufacture a unified silicone rubber molded article containing the conductive silicone rubber cured component and the insulating silicone rubber cured component.

The above-mentioned method tends to suffer from an inhibition of vulcanization of the insulating rubber component by the organic peroxide due to the carbon black present in the conductive silicone rubber. For this reason, the organic peroxide to be used should have an activation energy of at least 33 kcal/mole and is limited to compounds such as dicumyl peroxide, di-t-butyl peroxide, and 2,5-dimethyl-2,5-di(t-butyl peroxy)hexane. However, even when the conductive rubber component is vulcanized in the presence of an organoperoxide which does not tend to exhibit vulcanization inhibition by the carbon black, vulcanization is still partially suppressed. In particular, the surface of the cured article is insufficiently cured. Due to this, the above-mentioned method exhibits drawbacks such as requiring a long vulcanization time at high temperatures during the molding process in order to manufacture a satisfactorily cured product.

U.S. patent application Ser. No. 447,588, filed on Dec. 7, 1982, discloses unitary molded silicone rubber articles similar to those disclosed in the aforementioned Japanese Patent Publication and which are useful as electrical contacts. The articles consist of a first portion of conductive silicone rubber containing from 5 to 75% by weight of carbon black and a second portion of insulating silicone rubber containing substantially no carbon black. The second portion of silicone rubber is cured in the presence of the previously cured first portion using an addition reaction and a platinum catalyst, and the first and second portions are united together to form a unitary article.

The method disclosed in this U.S. patent application avoids the disadvantages inherent in the method disclosed in the aforementioned Japanese Patent Publication by employing an insulating silicone rubber component that is cured using a platinum catalyst. The conductive rubber component can be cured using an organic peroxide or the same method employed to cure the insulating rubber component.

SUMMARY OF THE INVENTION

Various methods were examined by the present inventor in attempting to overcome the drawbacks exhibited by prior art molded silicone rubber products. The present inventor has discovered that these drawbacks can be eliminated by employing a curing procedure for the carbon black-free insulating portion of the molded article which differs from the curing procedures of the prior art. In accordance with the present method, a carbon black-containing conductive silicone rubber which has been cured by an addition reaction in the presence of a platinum-type catalyst is tightly contacted with an unvulcanized insulating silicone rubber to which a nonacyl-type organoperoxide has been added, and the insulating silicone rubber is subsequently cured at an elevated temperature.

DETAILED DESCRIPTION OF THE INVENTION

This invention provides a unitary molded article consisting essentially of (A) a cured, conductive silicone rubber component containing from 5 to 75 weight percent carbon black, said component having been cured by an addition reaction in the presence of a platinum-type catalyst, and (B) a cured insulating silicone rubber component containing substantially no carbon black, said insulating silicone rubber component having been cured using a nonacyl-type peroxide, and where said conductive component and said insulating component form a unitary article.

This invention also provides a method for preparing a unitary molded silicone rubber article comprising (I) tightly contacting (A) a cured conductive silicone rubber component containing carbon black, said rubber having been cured by an addition reaction in the presence of a platinum-type catalyst, and (B) an uncured insulating silicone rubber component containing substantially no carbon black, and from 0.2 to 5.0 weight percent of nonacyl-type organic peroxide sufficient to cure said insulating silicone rubber component, and (II) curing the insulating silicone rubber component at an elevated temperature.

Compositions which are cured to form the conductive silicone rubber component of the unitary molded articles of this invention comprise carbon black, an organopolysiloxane which is a liquid or a gum at room temperature and contains at least two alkenyl groups, such as vinyl or allyl per molecule, e.g., dimethylvinylsiloxy-terminated polydimethylsiloxanes, dimethylvinylsiloxy-terminated dimethylsiloxane-methylvinylsiloxane copolymers, methylphenylvinylsiloxy-terminated dimethylsiloxane-methylphenylsiloxane-methylvinylsiloxane copolymers, and dimethylvinylsiloxy-terminated polymethyl(3,3,3-trifluoropropyl)-siloxanes; an organohydrogenpolysiloxane which is a liquid at room temperature; e.g., trimethylsiloxy-terminated polymethylhydrogensiloxanes, trimethylsiloxy-terminated dimethylsiloxane-methylhydrogensiloxane copolymers, and tetramethyltetrahydrogencyclotetrasiloxane; an addition-reaction platinum-type catalyst such as platinum black, platinum sponge, platinic chloride, chloroplatinic acid, the reaction product of chloroplatinic acid and a monohydric alcohol, a chloroplatinic acid-olefin complex, a chloroplatinic acid-vinylsiloxane complex, platinum bis-acetoacetate, palladium catalysts, and rhodium catalysts.

In many instances, the conductive silicone rubber component contains reinforcing fillers, e.g., fumed silica and wet-process silica, including those fillers which are hydrophobicized, addition reaction retarders, e.g., organonitrogen compounds, alkyne compounds and tin compounds; and occasionally also additional materials such as extenders, surface-treatment agents for the reinforcing fillers, conductive fibers, conductive metals, conductive metal oxides, thermal stabilizers, and pigments.

The carbon black is preferably a conductive grade. Many conductive grades can be found among the furnace and acetylene blacks. The carbon black content should be from 5 to 75 weight %. When the carbon black content is less than 5 weight %, the conductivity or adhesion will be insufficient. On the other hand, when it is greater than 75 weight %, the workability will decline while there is no further increase in the conductivity or adhesion. Preferably the content of carbon black is from 10 to 40 weight %.

Methods for molding the carbon black-containing silicone rubber component include compression molding, injection molding, extrusion molding (hot air vulcanization) and transfer molding. In any case, the conductive rubber can be molded at a lower temperature and for a shorter vulcanization time than the traditional method employing an organoperoxide. Moreover, a conductive silicone rubber in which both the surface and interior have been uniformly cured can be readily produced because vulcanization or curing is not inhibited by the carbon black. A molded conductive silicone rubber component whose surface and interior have been satisfactorily cured offers advantages. For example, when the cured conductive silicone rubber component is tightly contacted with an uncured insulating silicone rubber and the resultant composite is then cured at an elevated temperature, the organoperoxide suppresses curing inhibition by carbon black, with the result that a unitary molded article in which both cured components are tightly adhered to each other can be manufactured. Furthermore, when the cured unitary molded article of this invention is used as a fixed or movable electrical contact, the carbon black-containing silicone rubber component does not exhibit delamination, carbon black exposure, or softening of the rubber. This is a useful feature of this invention.

As used herein, the term "substantially no carbon black" implies that the insulating silicone rubber component contains no carbon black or, at most, an extremely small amount of carbon black for purposes of imparting coloration or flame retardancy. As principal components, the unvulcanized insulating silicone rubber contains a polydiorganosiloxane that is usually a gum at room temperature and preferably contains at least 2 alkenyl groups, such as vinyl or allyl, per molecule, e.g., dimethylsiloxane-methylvinylsiloxane copolymers, dimethylsiloxane-methylphenylsiloxane-methylvinylsiloxane copolymers, methyl(3,3,3-trifluoropropyl)siloxane-methylvinylsiloxane copolymers, and dimethylsiloxane-methylallylsiloxane copolymers; and reinforcing silica fillers, such as fumed silica and wet-process silica, including those fillers which are hydrophobicized. The terminal groups of the aforementioned copolymer can be silanol, trimethylsiloxy, dimethylvinylsiloxy or methylphenylvinylsiloxy.

If necessary, the insulating silicone rubber component also contains additional materials such as extenders, surface-treatment agents for the reinforcing silica fillers, thermal stabilizers and pigments. Conductive metals and conductive fibers may be added; however, they are not normally present in the cured insulating component.

The nonacyl-type organoperoxide suitable for curing the insulating rubber component is an organic peroxide which does not possess the acyl groups present in benzoyl peroxide and 2,4-dichlorobenzoyl peroxide. The class of nonacyl type peroxides includes dicumyl peroxide, di-t-butyl peroxide, 2,5-dimethyl-2,5-di(t-butyl peroxy)hexane and 2,5-dimethyl-2,5-di(t-butyl peroxy)hexene. The quantity of this nonacyl-type organoperoxide should be 0.2–5.0 weight %, based on the unvulcanized silicone rubber.

The use of nonacyl-type organoperoxides achieves a tight and durable adhesion of the insulating silicone rubber component to the carbon black-containing conductive silicone rubber component.

The uncured silicone rubber which contains a nonacyl-type organoperoxide and substantially no carbon black is tightly contacted with the cured carbon black-containing conductive silicone rubber cured component, and the resultant composite is molded and cured at an elevated temperature. The molding method should be an elevated-pressure molding method such as compression molding, injection molding and transfer molding. The molding temperature is usually a temperature of from 120° to 200° C. and the molding time is usually from 5 to 20 minutes.

If necessary, post curing, for example a hot air curing at 150°–260° C. for 1–24 hours, should be conducted in order to remove the residue resulting from decomposition of the organoperoxide.

The present method yields a unitary silicone rubber molded article which combines a cured carbon black-containing conductive silicone rubber component, which is cured by an addition reaction in the presence of a platinum-type catalyst, with an insulating nonacyl-type organoperoxide-cured silicone rubber component which contains substantially no carbon black and is cured using a nonacyl-type organoperoxide.

The above-mentioned cured silicone rubber molded article is characterized by a tight and durable adhesion between the conductive and insulating components and by a uniform curing of the interior and surface of the conductive component. The article is therefore very useful for electrical contacts such as two-color keyboard pads and zebra-type connectors and in various electrical and electronic parts such as ignition cables which are usually subjected to repeated deformation, strain or friction.

This invention will be explained in detail in the following examples. The term "parts" denotes "parts by weight." All viscosities reported were measured at 25° C.

EXAMPLE 1

A methylphenylvinylsiloxy endblocked polydimethylsiloxane exhibiting an average degree of polymerization of 320 (100 parts) and 50 parts or 20 parts of Denka Black (a conductive acetylene black from Denki Kagaku Kogyo Co. Ltd.) were blended to achieve a uniform composition. At this time 1.8 parts of a trimethylsiloxy-terminated dimethylsiloxane-methylhydrogensiloxane copolymer containing 50 mol % of dimethylsiloxane units, 50 mol % of methylhydrogensiloxane units and exhibiting a viscosity of $5 \times 10^{-6}$ m$^2$/s, 1.0 part of an isopropanol solution of chloroplatinic acid containing 0.34 weight % of platinum, and 0.05 part of methylbutynol were added and the resultant composition was blended to achieve uniformity. The resultant mixture was placed in an injection molding machine, degassed and injection molded for 1 minute at 150° C. under a pressure of 40 kg./cm$^2$ (3.92 MPa) to obtain two conductive molded silicone rubber articles containing, respectively, 33.3 weight % and 16.6 weight % of acetylene black. The surface of both articles were smooth and lustrous and the surface and interior portions of both articles were uniformly cured.

A polydimethylsiloxane gum (100 parts) containing 99.8 mol % dimethylsiloxane units and 0.2 mol % methylvinylsiloxane units was blended with 40 parts of wet-process silica to achieve a uniform mixture, at which time 1.5 parts of dicumyl peroxide were added and the mixture thoroughly blended. A portion of the resultant composition was placed in a mold together with each of the two cured conductive silicone rubber components prepared as described in the first part of this example. Each of the two composites were molded at 150° C. under a pressure of 100 kg/cm$^2$ (9.8 MPa) for 10 minutes. The molded samples were then placed for four hours in a hot air-circulating oven maintained at a temperature of 200° C. The two resultant products were unitary molded articles comprising a cured conductive silicone rubber component containing, respectively, 33.3 and 16.6 weight % acetylene black and curable by an addition reaction, and a cured silicone rubber component containing 28.6 weight % of wet-process silica.

The cured unitary molded articles were inserted between the clamps of a tensile tester in order to measure tensile strength. The results of the measurement showed that the cured components containing 33.3 weight % and 16.6 weight % of acetylene black failed; however the interface between the conductive and insulating components was not damaged. The tensile strengths for the samples containing 33.3 weight % and 16.6 weight % of acetylene black were 51 and 44 kg./cm$^2$ (5.0 and 4.3 MPa), respectively.

EXAMPLE 2

A copolymer gum (100 parts) containing 99.7 mol % dimethylsiloxane units and 0.3 mol % methylvinylsiloxane units was blended with 15 parts of Ketjenblack EC (a conductive furnace black from Lion Akzo Co., Ltd.) to obtain a uniform mixture. The dimethylsiloxane-methylhydrogensiloxane copolymer described in Example 1 (0.8 part), and 0.2 part of an isopropanol solution of chloroplatinic acid containing 0.34 weight % of platinum were then added and the resultant mixture was rapidly blended to produce a uniform composition. This composition was placed in a metal mold and molded at 100° C. under a pressure of 100 kg/cm$^2$ (9.8 MPa) for 2 minutes to obtain a cured conductive silicone rubber component containing 12.9 weight % of furnace black.

An uncured silicone rubber (100 parts) containing 28.6 weight % of wet-process silica and identical to that used in Example 1 was combined and thoroughly blended with 0.5 part of 2,5 dimethyl-2,5-di(t-butyl peroxy)hexane. The resultant mixture was placed in a metal mold together with the cured conductive silicone rubber component described in the first part of this example and molded for 10 minutes at a temperature of 170° C. and under a pressure of 100 kg./cm$^2$ (9.8 MPa). The resultant product was a unitary body containing a cured conductive silicone rubber component with 12.9 weight % of conductive furnace black and a cured silicone rubber component containing 28.6 weight % of wet-process silica.

The cured unitary article was inserted between the clamps of a tensile tester in order to measure tensile strength. The results showed that the cured silicone rubber component which contained Ketjenblack failed; however the interface between the two cured components was not damaged. The tensile strength was 40 kg./cm$^2$ (3.92 MPa).

That which is claimed is:

1. A molded article consisting essentially of (A) a cured conductive silicone rubber containing from 5 to 75 weight percent carbon black, said component being cured by an addition reaction in the presence of a platinum type catalyst, and (B) a cured insulating silicone rubber component containing substantially no carbon black and which is cured by from 0.2 to 5.0 weight percent of a non-aryl peroxide, wherein said conductive and insulating components form a unitary article.

2. The molded article of claim 1 wherein the conductive silicone rubber component is cured by an addition reaction between a polyorganosiloxane containing at least 2 alkenyl groups and a polyorganohydrogensiloxane.

3. The molded article of claim 1 wherein the conductive silicone rubber component contains from 10 to 50 weight percent of conductive grade carbon black.

4. The molded article of claim 1 wherein the article forms a two-color keyboard pad.

5. The molded article of claim 1 wherein the article forms a zebra-type connector.

6. The molded article of claim 2 wherein the article forms a two-color keyboard pad.

7. The molded article of claim 2 wherein the article forms a zebra-type connector.

8. The molded article of claim 1 wherein the article forms an electrical contact.

9. The molded article of claim 2 where the article forms an electrical contact.

10. A method for preparing a unitary molded silicone rubber article comprising
   (I) tightly contacting
      (A) a cured conductive silicone rubber component containing from 5 to 75 weight percent carbon black, said component having been cured by an addition reaction in the presence of a platinum-type catalyst, and
      (B) an uncured insulating silicone rubber component containing substantially no carbon black and from 0.2 to 5.0 weight percent of a nonacyl-type organoperoxide, and
   (II) curing the insulating silicone rubber component at an elevated temperature to form a unitary silicone rubber article.

11. The method of claim 10 wherein the conductive silicone rubber component is cured by an addition reaction between a polyorganosiloxane containing at least two alkenyl groups and a polyorganohydrogensiloxane.

12. The method of claim 11 wherein said alkenyl groups are vinyl groups.

13. The method of claim 10 wherein said platinum-type catalyst is chloroplatinic acid.

14. The method of claim 11 wherein said cured conductive component contains from 10 to 50 weight % of conductive carbon black.

15. The method of claim 10 wherein said nonacyl-type organoperoxide is dicumyl peroxide or 2,5-dimethyl-2,5-di(t-butylperoxy)hexane.

16. The method of claim 10 wherein said uncured insulating silicone rubber component is cured at a temperature of from 120° to 200° C. for from 5 to 20 minutes.

17. The method of claim 10 wherein said insulating silicone rubber is post cured at a temperature of from 150° to 260° C. for from 1 to 24 hours.

18. The method of claim 10 wherein said insulating silicone rubber component contains a reinforcing silica filler.

* * * * *